United States Patent
MacLachlan (10) Patent No.: US 8,863,944 B2
(45) Date of Patent: Oct. 21, 2014

(54) ABRASION RESISTANT CONVEYOR BELT

(75) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 154 days.

(21) Appl. No.: 13/400,336

(22) Filed: Feb. 20, 2012

(65) Prior Publication Data

US 2013/0213775 A1  Aug. 22, 2013

(51) Int. Cl.
*B65G 17/06* (2006.01)

(52) U.S. Cl.
USPC ............................ 198/853; 198/851; 198/852

(58) Field of Classification Search
USPC ........................... 198/853, 852, 851, 850, 834
See application file for complete search history.

(56) References Cited

U.S. PATENT DOCUMENTS

| | | | |
|---|---|---|---|
| 3,628,834 A | 12/1971 | Anderson | |
| 4,394,901 A | 7/1983 | Roinestad | |
| 4,815,271 A * | 3/1989 | Lapeyre | ............................ 59/84 |
| 5,105,938 A | 4/1992 | Tan | |
| 5,217,110 A | 6/1993 | Spangler et al. | |
| 5,921,379 A | 7/1999 | Horton | |
| 6,305,530 B1 | 10/2001 | Guldenfels | |
| 6,604,625 B2 * | 8/2003 | Greve | ............................ 198/853 |
| 6,672,451 B1 * | 1/2004 | Thompson et al. | ............ 198/850 |
| 6,749,059 B2 | 6/2004 | Gundlach et al. | |
| 6,837,367 B1 * | 1/2005 | Klein et al. | ....................... 198/853 |
| 7,055,678 B2 * | 6/2006 | Gundlach et al. | .............. 198/851 |
| 7,080,729 B2 | 7/2006 | Guldenfels et al. | |
| 7,281,626 B2 * | 10/2007 | Guldenfels | .................... 198/852 |
| 7,360,644 B1 | 4/2008 | Lucchi et al. | |
| 7,364,038 B2 | 4/2008 | Damkjaer | |
| 7,828,136 B2 | 11/2010 | Damkjaer | |
| 8,397,903 B2 * | 3/2013 | Andersen | ....................... 198/778 |
| 2002/0129481 A1 | 9/2002 | Palmaer et al. | |
| 2006/0272931 A1 | 12/2006 | Knott et al. | |

OTHER PUBLICATIONS

International Search Report and Written Opinion of the International Searching Authority, PCT/US2013/026421, mailed May 10, 2013, European Patent Office, Rijswijk, NL.

* cited by examiner

*Primary Examiner* — Ramya Burgess
*Assistant Examiner* — Lester Rushin
(74) *Attorney, Agent, or Firm* — Catherine M. Bishop (57) ABSTRACT

A wear-resistant modular plastic conveyor belt can resist wear at the hinge for a long operating life, even in abrasive environments. The conveyor belt comprises a plurality of modules having T-shaped link ends interleaved together. A hinge rod may be inserted in a hinge passageway, formed at least in part by kidney-shaped openings in the T-shaped links. The conveyor belt employs multiple surfaces to transfer load from module to module during operation of the conveyor belt depending on the relative motion of the modules.

38 Claims, 10 Drawing Sheets

ABRASION RESISTANT CONVEYOR BELT

FIELD OF THE INVENTION

The present invention relates to the field of power-driven conveyors. More particularly, the present invention relates to modular plastic conveyor belts formed of rows of plastic belt modules hingedly interconnected row to row by hinge rods.

BACKGROUND OF THE INVENTION

Conventional modular conveyor belts and chains are constructed of modular links, or belt modules, arranged in rows. Spaced apart hinge eyes extending from each end of the modules include aligned openings. The hinge eyes along one end of a row of modules are interleaved with the hinge eyes of an adjacent row. A hinge rod, inserted in the aligned openings of interleaved hinge eyes, connects adjacent rows together end to end to form an endless conveyor belt capable of articulating about a drive sprocket or drum.

Because modular plastic conveyor belts do not corrode and are easy to clean, they are often used instead of metal belts. Usually, the hinge rods in plastic belts are also made of plastic. The hinge rods are typically circular in cross section and reside in circular openings in the hinge eyes. Relative motion between the hinge rods and the walls of the hinge eyes in the module as the belt articulates about sprockets or during other bending of the belt tends to wear both the hinge rod and the hinge eye wall. In abrasive environments, such as in conveying potatoes and other agricultural produce, this wear is accelerated by the intrusion of dirt and grit into the hinges of the belt.

Several solutions have been proposed to resist wear in module plastic conveyor belts. For example, non-circular hinge strips made of a flexible material and other approaches have been proposed to resist wear. Hinge eyes forming slots with flared ends permit the confined hinge strip to flex a limited angle without frictionally rubbing with the hinge eyes as the belt articulates. Such an arrangement is effective in increasing wear life, but the flexible hinge strip is inherently weak in shear strength and unsuitable for carrying heavy loads.

Metal hinge rods or hinge rods made of multiple materials have also been used to increase the wear life of the rods. But that does not do away with the relative motion between rod and hinge eye wall, and belt module wear at the hinge is still a problem.

U.S. Pat. No. 7,055,678 discloses a barrel-shaped hinge rod that is retained snugly in the hinge eyes along one belt row. The openings in the interleaved hinge eyes of the adjacent row are larger to allow the belt to articulate at the hinge between the adjacent rows. But the larger opening affords the hinge rod clearance that results in undesirable motion and rubbing of the rod against the walls of the larger openings.

Thus, there is a need for a modular plastic conveyor belt that can resist wear at the hinge for a long operating life even in abrasive environments.

SUMMARY OF THE INVENTION

The present invention provides a wear-resistant modular plastic conveyor belt that can resist wear at the hinge for a long operating life, even in abrasive environments. An abrasion resistant belt comprises a plurality of modules linked together, each module comprising a central portion, a first linking portion on a first end of the central portion comprising a plurality of T-shaped links and a second linking portion on a second end of the central portion comprising a plurality of T-shaped links. The first linking portion and second linking portion interleave, such that load-transferring surfaces on the T-shaped links contact each other. A hinge rod may be inserted in a hinge passageway, formed at least in part by kidney-shaped openings in the T-shaped links. The conveyor belt employs multiple surfaces to transfer load from module to module during operation of the conveyor belt, depending on the relative motion of the modules.

According to one aspect of the invention, a module for a conveyor belt comprises a central portion having a first end and an opposite second end defining the length of the central portion, a top side and an opposite bottom side defining the thickness of the central portion, and a first edge and an opposite second edge defining the width of the central portion. The module further includes a first linking portion comprising at least one link extending from the first end of the central portion. The link comprises a rib and a transverse link end extending perpendicular to the rib. The transverse link end includes an upper load-transferring surface, a lower load-transferring surface, and a channel separating the upper load-transferring surface from the lower load-transferring surface.

According to another aspect of the invention, a module for a conveyor belt comprises a central portion having a first end and an opposite second end defining the length of the central portion, a top side and an opposite bottom side defining the thickness of the central portion, and a first edge and an opposite second edge defining the width of the central portion. A first linking portion comprising a first set of T-shaped links extends from the first end of the central portion. A second linking portion comprising a second set of T-shaped links extends from the second end of the central portion. The T-shaped links of the first set are substantially identical to the T-shaped links of the second set.

According to still another aspect of the invention, a module for a conveyor belt comprises a central portion having a first end and an opposite second end defining the length of the central portion, a top side and an opposite bottom side defining the thickness of the central portion, and a first edge and an opposite second edge defining the width of the central portion. A first linking portion comprising a plurality of links extends from the first end of the central portion. The module further includes a plurality of kidney-shaped hinge openings formed in the links.

According to another aspect of the invention, a conveyor belt comprises a first module and a second module linked to the first module. The first module comprises a first central portion, a plurality of first T-shaped link elements extending from a first end of the first central portion, and a plurality of aligned first hinge openings formed in the plurality of first T-shaped link elements. The second module comprises a second central portion, a plurality of second T-shaped link elements linked with the first T-shaped link elements of the first module, and a plurality of aligned second hinge openings. The first and second hinge openings align to form a hinge passageway, with a hinge rod inserted into the hinge passageway.

According to yet another aspect of the invention, a module for a conveyor belt comprises a central portion having a first end and an opposite second end defining the length of the central portion, a top side and an opposite bottom side defining the thickness of the central portion, and a first edge and an opposite second edge defining the width of the central portion. The module further comprises a first linking portion comprising at least one link extending from the first end of the central portion, the link comprising a rib extending in thickness from a top surface to a bottom surface and a transverse link end extending perpendicular to the rib, the transverse link end extending in thickness from a top edge that is coplanar with the top surface of the rib to a bottom edge that is coplanar with the bottom surface of the rib.

According to a final aspect of the invention, a module for a conveyor belt comprises a central portion having a first end and an opposite second end defining the length of the central portion, a top side and an opposite bottom side defining the thickness of the central portion, and a first edge and an opposite second edge defining the width of the central portion. A first link extends from the second end of the central portion. The first link comprises a first rib and a first transverse link end extending perpendicular to the first rib. A second link extends from the first end of the central portion. The second link comprises a second rib and a second transverse link end extending perpendicular to the second rib. The first and second ribs are separated by a rib separation distance that is substantially equal to the widths of the first and second transverse link ends.

BRIEF DESCRIPTION OF THE FIGURES

These aspects and features of the invention, as well as its advantages, are described in more detail in the following description, appended claims, and accompanying drawings, in which:

DETAILED DESCRIPTION

The present invention provides a wear-resistant modular plastic conveyor belt. The present invention will be described below relative to certain illustrative embodiments. Those skilled in the art will appreciate that the present invention may be implemented in a number of different applications and embodiments and is not specifically limited in its application to the particular embodiments depicted.

Figure 1:
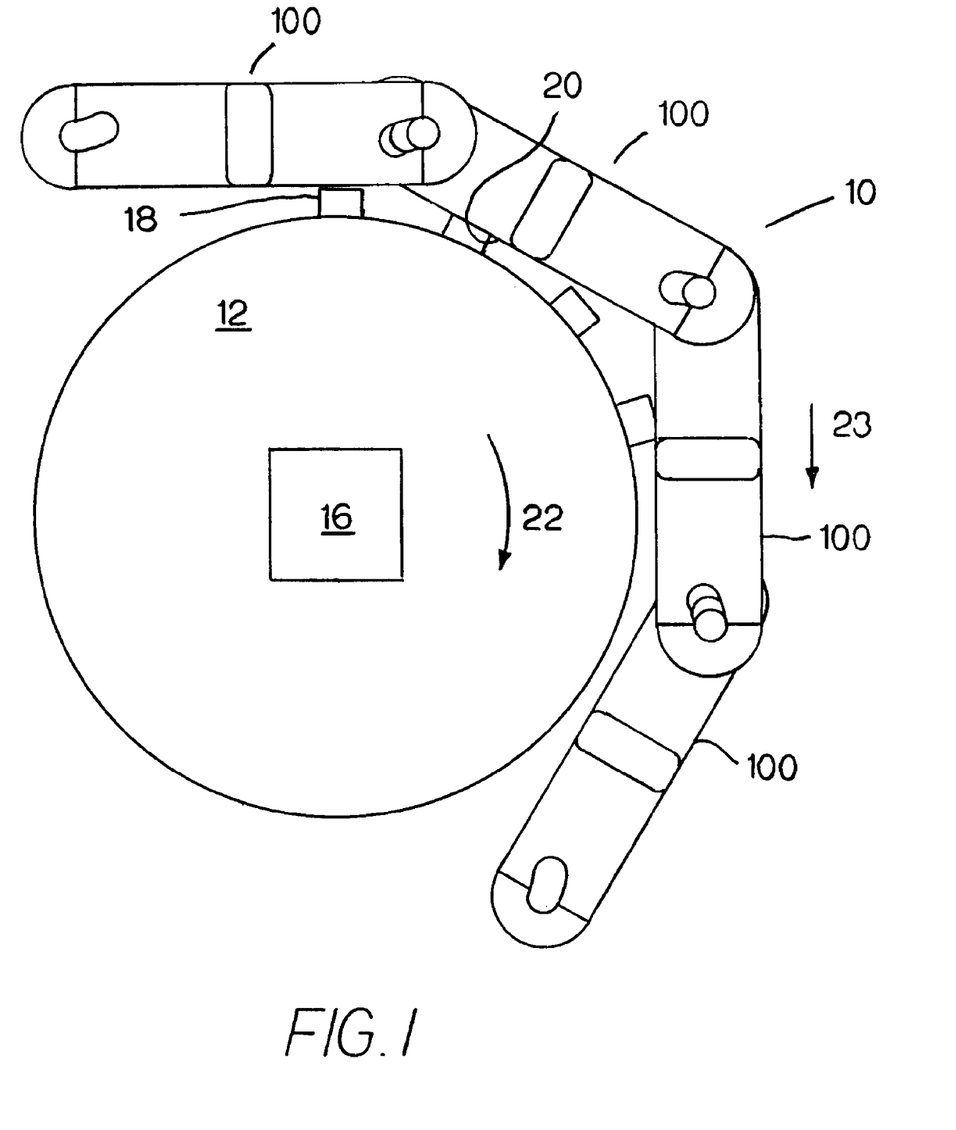
FIG. 1 is a partial cross-sectional view of a conveyor belt embodying features of the invention.

A portion of a conveyor belt 10 having features of the invention is shown in FIG. 1 engaged with and articulating about a sprocket 12. The sprocket 12 has a central bore 16 for a shaft (not shown), which may be driven by a drive motor (not shown). Teeth 18 on the periphery of the sprocket engage drive surfaces in the conveyor belt, such as the walls of drive pockets 20 formed in the underside of the belt. As the sprocket rotates in the direction of curved arrow 22, the belt is driven in a direction of travel indicated by arrow 23. The direction of belt travel is provided for reference only, as the conveyor belt 10 of the present invention may be driven in either direction.

The illustrative belt comprises a plurality of rows of modules 100 connected together in series (end to end) to form an endless conveyor belt. Each row in the conveyor belt may comprise multiple modules arranged side-by-side, or a single module. Typical modular plastic conveyor belts are manufactured and sold, for example, by Intralox, Inc. of Harahan, La., USA. The belt modules are conventionally made by injection-molding thermoplastic materials such as polypropylene, polyethylene, acetal, nylon, or composite polymers, to name a few.

Figure 2:
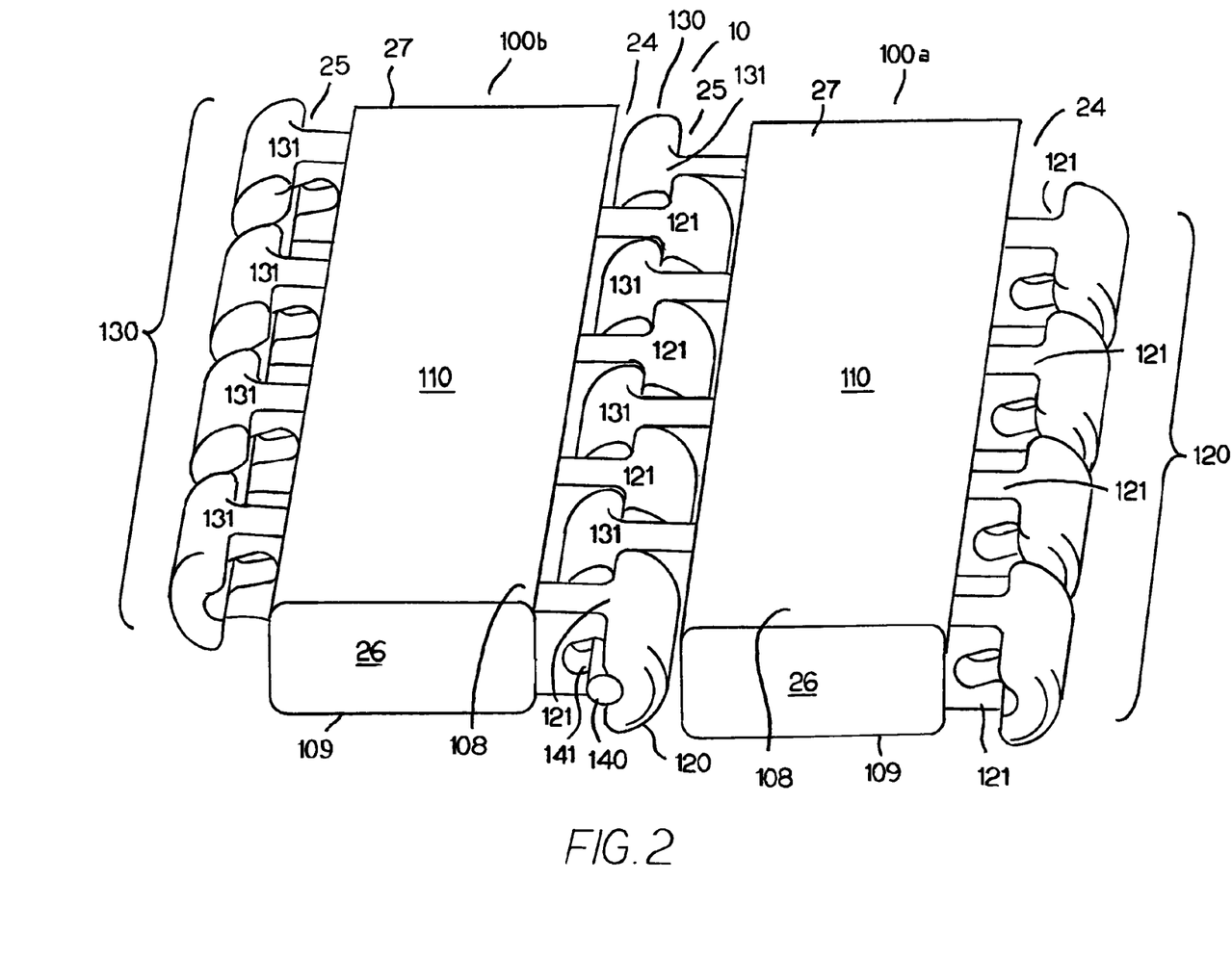
FIG. 2 is a perspective view of two conveyor belt modules linked together according to an illustrative embodiment of the invention.

Referring to FIG. 2, the modules 100 on each row extend in the direction of belt travel from a forward (lead) end 24 to a rearward (lag) end 25 and in width from a first side edge 26 to a second side edge 27. According to an illustrative embodiment of the invention, each module includes a central portion 110 and linking portions 120, 130 extending outward at each end 24, 25, respectively, for linking the modules together end to end, as described in detail below. The outer surfaces of the central portion and the outer surfaces of the linking portions form a conveying surface 108 on which articles are conveyed. The inner surfaces of the central portion and the inner surfaces of the linking portions form inner surface 109, which may comprise a drive surface used to drive the belt 10. The outer surfaces of the linking portions may be coplanar and merely extensions of the outer surfaces of the central portion. The inner surfaces of the linking portions may be coplanar and merely extensions of the inner surfaces of the central portion.

The first linking portion 120 includes a first set of T-shaped link elements 121 spaced across the width of the belt at the first end 24. The second linking portion 130 includes a second set of T-shaped link elements 131 spaced across the width of the module at the second end 25. To construct the conveyor belt 10, the modules 100 are arranged end-to-end with a first set of link elements 121 along the forward end 24 of a trailing module 100a interleaved with a second set of link elements 131 along the rearward end 25 of an adjacent leading module 100b, as shown in FIG. 2. A hinge rod 140 or other type of connector may be inserted through a passageway 141 formed in the linking portions 120, 130 to facilitate the assembly of the modules. The hinge rod may also prevent vertical movement of two modules relative to each other.

The illustrative conveyor belt module 100 employs multiple surfaces to transfer load from row to row during operation of the conveyor belt, depending on the relative motion of the modules. The configuration of the link elements and the hinge passageway of a particular embodiment of the belt module 100 are described in detail, with reference to FIGS. 3-10. In the embodiment of FIGS. 3-10, the central portion 110 of a module 100 includes a transverse elongate member 111 extending along the width of the module transverse to the direction of travel 23. Ribs extend from the elongate member 111 in the direction of travel, perpendicular to the transverse elongate member 111. The illustrative module 100 includes a first set of ribs 113 extending on a first side (lead end) of the transverse elongate member 111 towards the first (lead) end 24 and a second set of ribs 114 extending on a second side (lag end) of the transverse elongate member 111 towards the second (lag) end 25. The lead ribs 113 are preferably transversely offset from the lag ribs 114. In the illustrative embodiment, the ribs 113, 114 are perpendicular to and integrally formed with the central transverse connecting member 111, though the invention is not limited to a perpendicular or integral relationship.

One skilled in the art will recognize that the central portion 110 may comprise any suitable configuration, and is not limited to the illustrative embodiment. For example, the central portion 110 may comprise planar structure that is solid, perforated, "open grid," flat, shaped or otherwise configured, and include linking elements comprising linking ribs with transverse link ends extending from either end of the central portion.

Figure 3:
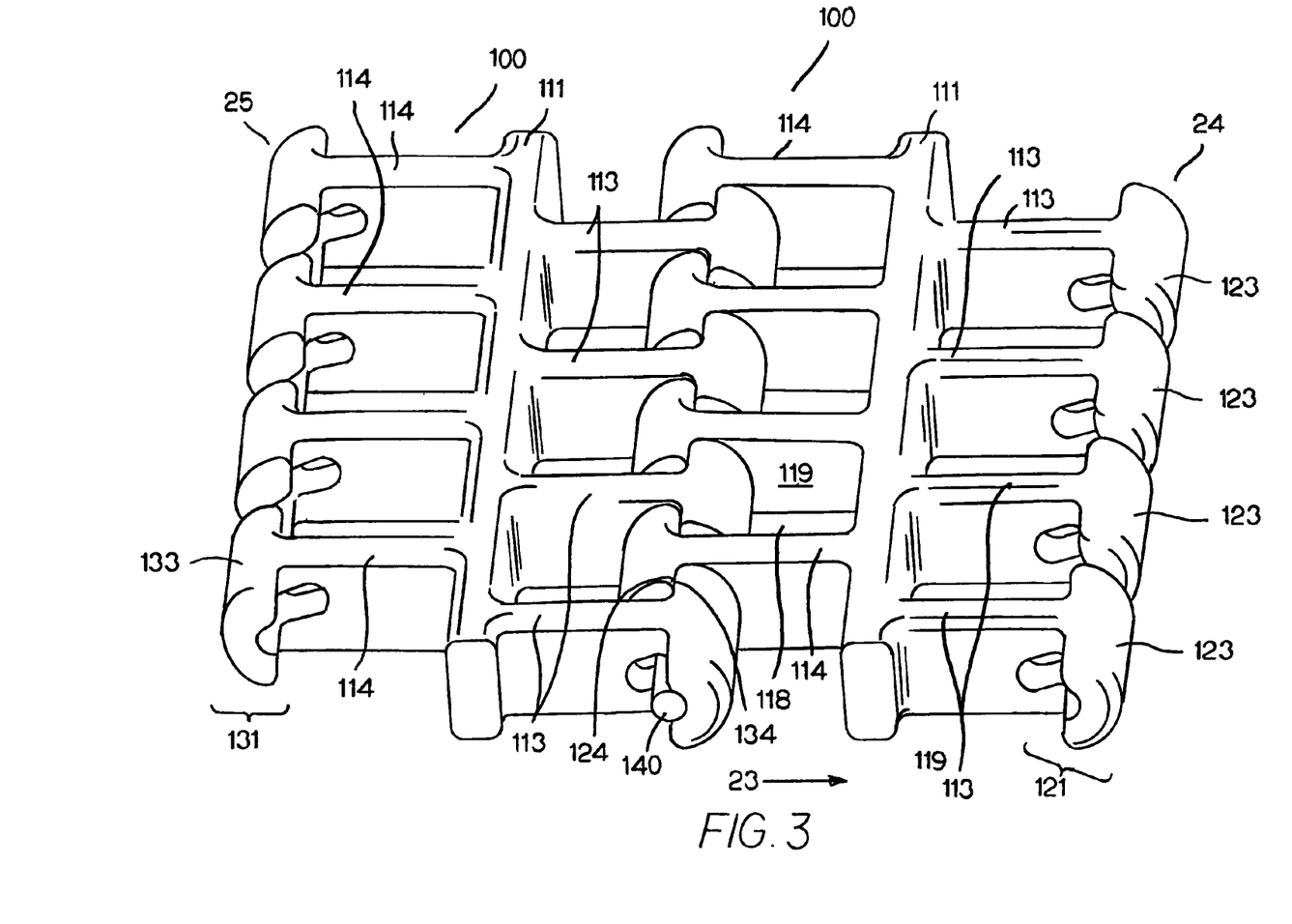
FIG. 3 is a perspective view of two conveyor belt modules linked together according to another embodiment of the invention.
Figure 4:
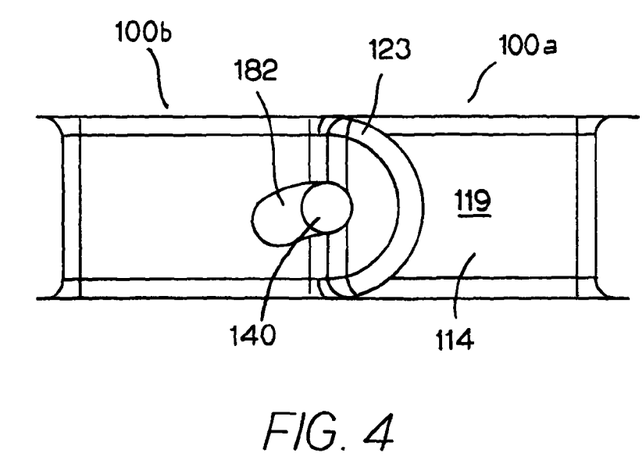
FIG. 4 is a side view of the linked conveyor belt modules of FIG. 3.

One or more of the lead ribs 113 terminate in a transverse link end 123 to form a T-shaped link element 121, and one or more of the lag ribs 114 terminate in a transverse link end 133 to form a T-shaped link element 131. In the illustrative embodiment, a plurality of transverse link ends 123, 133 are spaced across each end 24, 25, respectively, of the module. The link ends 123, 133 facilitate a connection between two adjacent modules in a conveyor belt, as shown in FIGS. 3 and 4. The illustrative lead and lag link ends 123, 133 extend substantially perpendicular to the ribs 113, 114, creating T-shaped link elements integrally formed with the central portion 110 of the module 100. In the illustrative embodiment, the ribs 113, 114 form a part of both the central portion 110 and the linking portions 120, 130 of the module, but the invention is not limited to the illustrative configuration.

As shown in FIGS. 6, 7, 9, and 10, each link end 123, 133 may comprise a semi-cylindrical member integrally formed with a rib 113 or 114. In the illustrative embodiment, each link end 123, 133 includes a curved outer surface 125, 135. The illustrative curved outer surfaces 125, 135 extend through a 180° arc beginning at the outer surface 108 of the corresponding rib and terminating at the inner surface 109 of the corresponding rib. Each illustrative link end 123, 133 further includes axially inner surfaces 124, 134 extending on either side of the rib 120, which serve as load-transferring surfaces, as described subsequently. Each inner surface 124, 134 extends from a top edge 161 that is coplanar and coextensive with the top surface 108 of the rib to a bottom edge 162 that is coplanar and coextensive with the bottom surface 109 of the rib, the central portion 110 or both, such that the load-transferring surfaces 124, 134 have substantially the same thicknesses as the corresponding ribs and the central portion of the module. The link ends 123, 133 further include side surfaces 128, 129, 138, 139. Preferably, the inner surface 124, 134 and side surfaces 128, 129, 138, 139 are substantially flat. Alternatively, the surfaces may be curved or otherwise shaped to enhance coupling of and load transfer between the modules.

Figure 8:
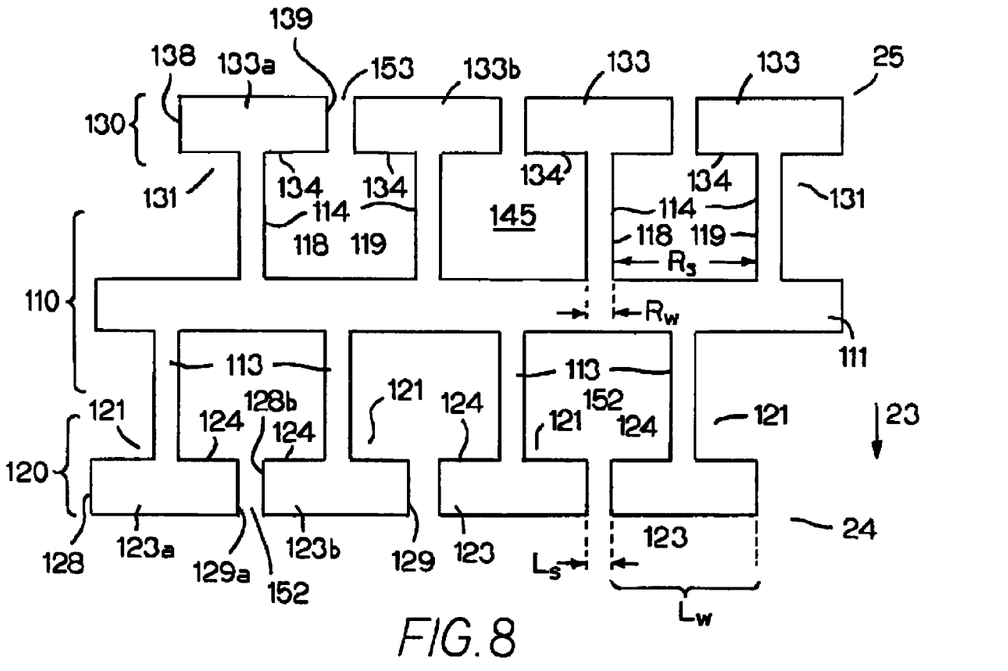
FIG. 8 is a top view of the module of FIG. 6.

As shown in FIG. 8, the link ends 123 are preferably spaced across each end of the module such that the space 152 between adjacent link ends 123a, 123b, (i.e., the distance between the side surfaces 128b, 129a of adjacent link ends 123a, 123b) accommodates the end of the rib 114 of another module when two modules are connected. The separation distance $L_s$ between the link ends 123 is preferably approximately equal to the width $R_w$ of each of the ribs. Due to the transverse offset of the lag ribs 114 from the lead ribs 113, the space 152 aligns with a lag rib 114, as shown in FIG. 8. The space 153 between adjacent link ends 133a, 133b accommodates the end of a lead rib 113 of another module when two modules adjacent modules are connected. When two modules 100a and 100b are interleaved, as shown in FIGS. 3 and 4, a first side surfaces 118 of a lag rib 114 on a first module 100a abuts or borders a side surface 128 of a lead link end, while a second side surface 119 of the lag rib 114 abuts or borders a side surface 129 of an adjacent lead link end. The lag rib 114 is therefore sandwiched between two side surfaces of adjacent link ends. The lead ribs are similarly sandwiched between lag link ends when the conveyor belt is assembled.

Each link end 123, 133 preferably has a width $L_w$ (the distance from side surface 128 to side surface 129 or side surface 138 to side surface 139) approximately equal to and slightly less than the distance $R_s$ between two opposing side surfaces 118, 119 of the ribs 113 or 114, allowing the link end to fit into a space 145 formed between adjacent ribs. The space 152 between adjacent link ends 123 aligns with the rib 114 on the opposite side of the module to facilitate interleaving of the link elements. The width $L_w$ of the link ends 123 is larger than the space 152 between adjacent link ends so that when the modules interleave, the load transferring surfaces 124 abut the load transferring surfaces 134.

The ends of the modules may be coupled by inserting link ends 123 of a first module into the spaces 145 between the ribs 114 on a second module, such that one or more of the inner load-transferring surfaces 124, 134 abut, as shown in FIGS. 3 and 4. The load-transferring surfaces and the interaction between the ribs and link end side surface 128, 129 prevent separation or relative movement of module ends.

Figure 5:
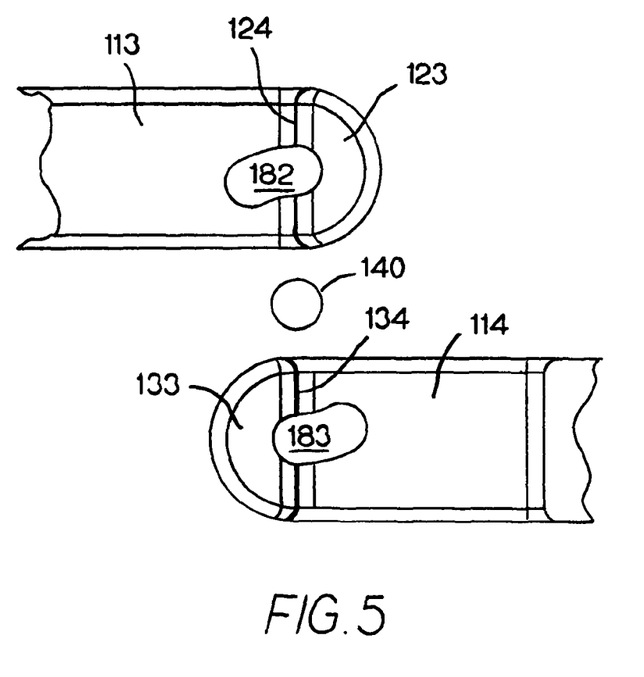
FIG. 5 is an exploded view of the linked conveyor belt modules of FIG. 3.

In one embodiment, the link ends or the ribs may be configured to receive a hinge rod or other type of connector to facilitate connection of the modules, as shown in FIGS. 3-5. For example, as shown in detail in FIGS. 9 and 10, each link end 123, 133 may include a transverse channel 172, 173 extending across the load-transferring inner surface 124, 134. The ribs 113, 114 include aligned hinge openings 182, 183 (see FIG. 6) that intersect the channels 172, 173. When the linking portions of adjacent modules are coupled, the channels 172, 173 and hinge openings 182, 183 form a continuous passageway for receiving a hinge rod 140 across the width of the belt. In the illustrative embodiment, the hinge rod 140 is round, which may promote abrasion resistance in the pitch direction of the belt. However, the hinge rod may alternatively have another shape or configuration.

Figure 9:
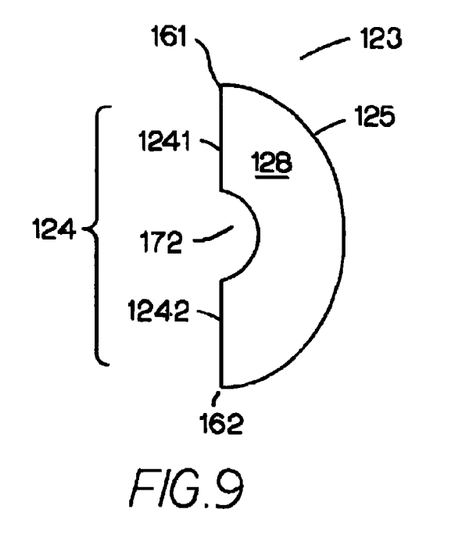
FIG. 9 is a side view of a lead link end of the module of FIG. 6.
Figure 10:
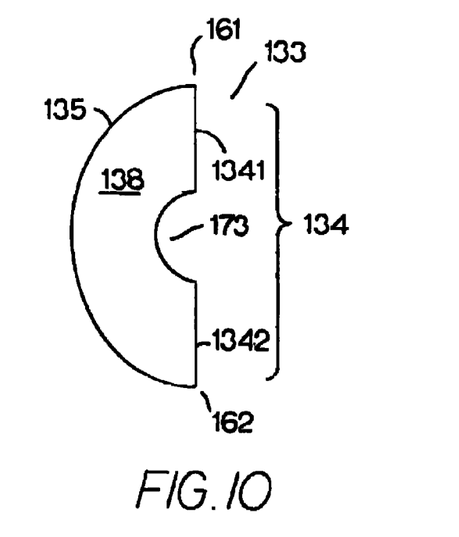
FIG. 10 is a side view of a lag link of the module of FIG. 6.

Referring to FIGS. 9 and 10, the lead link end transverse channel 172 divides the corresponding load-transferring surface 124 into an upper load-transferring surface 1241 and a lower load-transferring surface 1242. The lag link end transverse channel 173 divides the corresponding load-transferring surface 134 into an upper load-transferring surface 1341 and a lower load-transferring surface 1342.

Figure 6:
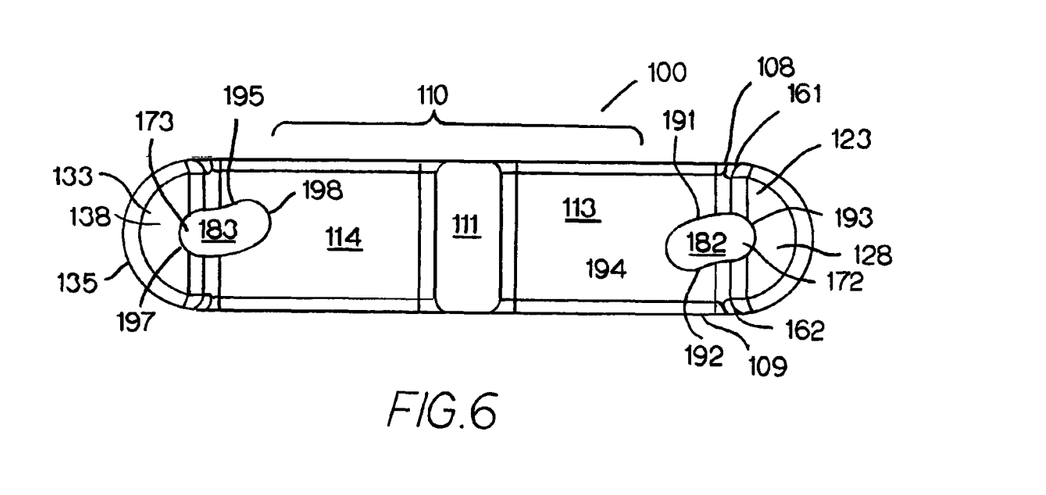
FIG. 6 is a side-view of a single conveyor belt module according to an illustrative embodiment of the invention.
Figure 7:
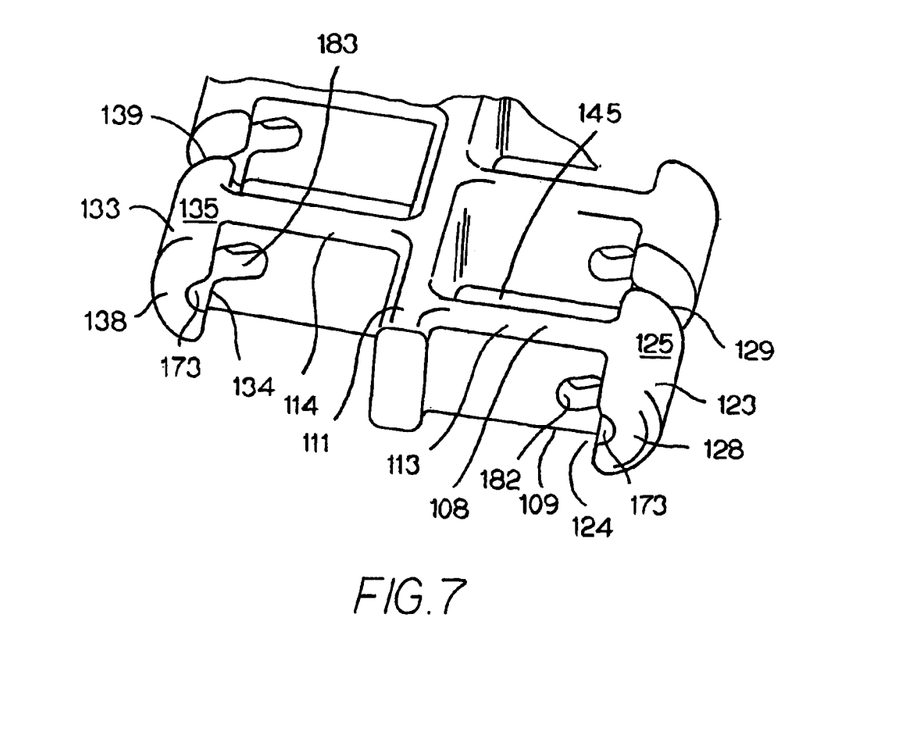
FIG. 7 is a perspective view of a portion of the module of FIG. 6.

As shown in FIG. 6, one or more of the hinge openings 182, 183 in the rib portions of the linking elements may be reniform, or kidney-shaped, in cross-section. In one embodiment, the hinge openings 182 on the leading link portion 121 curve in an opposite direction from the hinge openings 184 on the lagging link portion 131. For example, the illustrative lead hinge openings 182 curve down, towards the bottom surface 109, while lag hinge openings 183, curve up, towards the upper surface 108. Each reniform lead hinge opening 182 includes a curved upper surface 191, a curved bottom surface 192 that is smaller than the upper surface 191, a curved outer side surface 193 that is an extension of the channel 172, and a curved inner side surface 194. The reniform lag hinge opening 183 includes a curved upper surface 195, a curved bottom surface 196 that is larger than the upper surface 195, a curved outer side surface 197 that is an extension of the channel 173, and a curved inner side surface 198.

During operation of a conveyor belt comprising a plurality of modules 100, load can be transferred between many surfaces of the modules 100. The illustrative design uses multiple surfaces to transfer load from row to row depending on the relative motion of the modules.

For example, when the conveyor belt is running straight in a horizontal direction, the hinge rod 140 contacts the opposing surfaces of channels 172, 173 and the outer side surfaces 193, 197 of the hinge openings of two connected modules, while upper load-transferring surfaces 1241 of a first module contact upper load-transferring surfaces 1341 of a second module and lower load-transferring surfaces 1242 of the first module contact lower load transferring surfaces 1342 of the second module, distributing the load from row to row. The hinge rod 140 prevents relative module movement of the modules in the vertical direction when the belt is running straight in the horizontal direction and can assist in transferring load from one module to the next module when the belt is in the straight position. During straight operation of the conveyor belt, the hinge rod 140 is locked between the surfaces 191, 192, 193, 195, 196, and 197 of two adjacent modules.

Figure 11:
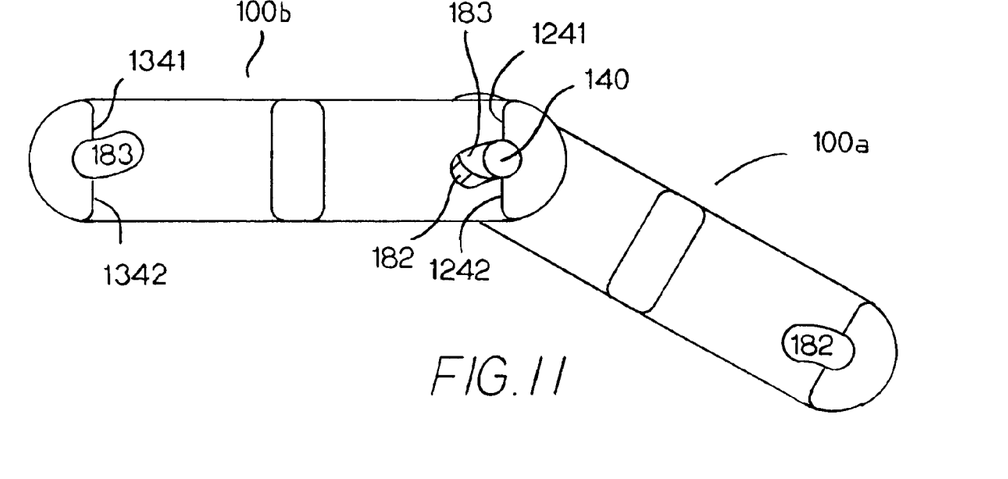
FIG. 11 illustrates two linked conveyor belt modules of an illustrative embodiment of the invention during a forward bend of the conveyor belt.
Figure 12:
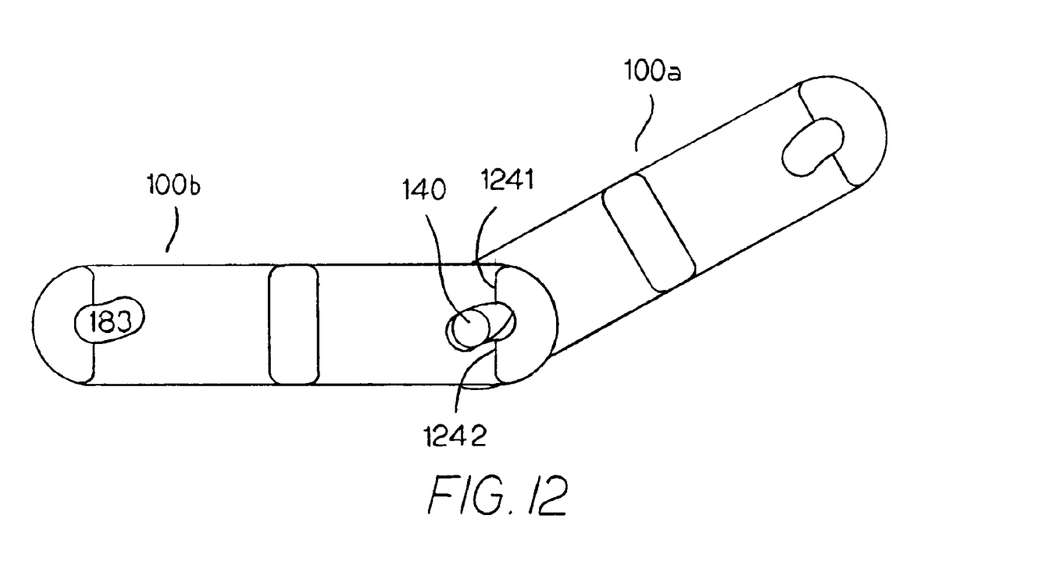
FIG. 12 illustrates two linked conveyor belt modules of an illustrative embodiment of the invention during a backward bend of the conveyor belt.
Figure 13:
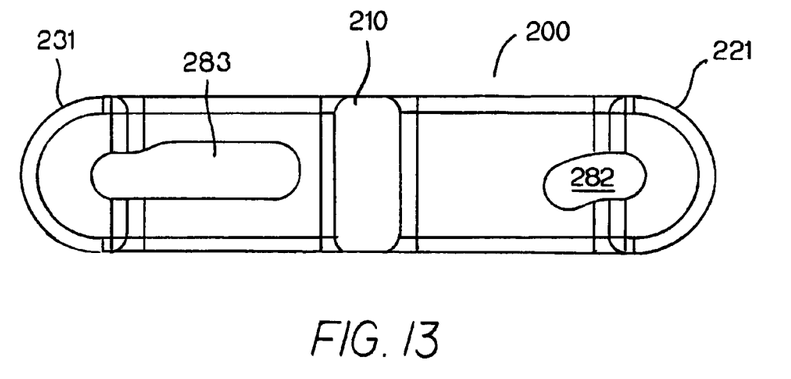
FIG. 13 is a side view of a radius conveyor belt embodying features of the invention.
Figure 14:
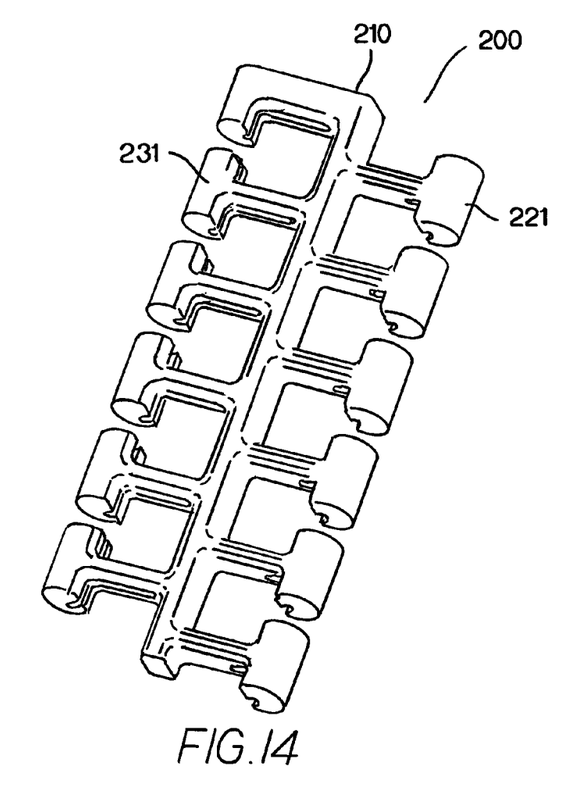
FIG. 14 is a perspective view of the radius conveyor belt module of FIG. 13.
Figure 15:
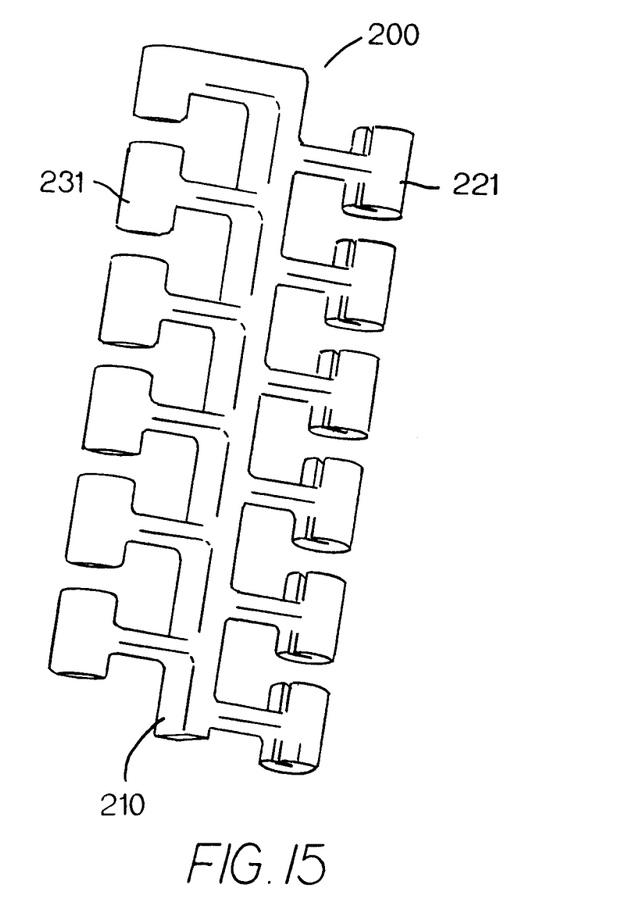
FIG. 15 is another view of the radius conveyor belt module of FIG. 13.

During a forward or backward bend of the conveyor belt, the surfaces on the linking elements transfer load from row to row, rather than the hinge rod. For example, as shown in FIG. 11, when the belt engages a sprocket, the belt will forward bend, with the lead module 100a bending downward relative to the lag module 100b. The forward bend will transfer the load between the upper load-transferring surfaces 1341 of the lead module and the upper load-transferring surfaces 1242 on the lag module. The hinge rod 140 will tend to float in the hinge openings 182, 183 during the forward bending motion, reducing wear. A backward bend of the modules relative to each other, shown in FIG. 12, transfers the load between lower load-transferring surfaces 1342 of the lead module 100a and lower load-transferring surfaces 1242 of the lag module 100b. The hinge rod 140 will tend to float in the hinge openings 182, 183 during the backward bending motion, reducing wear. While the load-transferring surfaces 1241, 1242, 1341, 1342 are flat in the illustrative embodiments, the load-transferring surfaces 1241, 1242, 1341, 1342 may alternatively be curved or have another shape to enhance operation of the belt.

FIGS. 13-16 illustrate a conveyor belt module 200 suitable for a radius conveyor belt according to another embodiment of the invention. The radius belt module 200 includes elongated hinge openings 283 in the lag links 231 to allow relative axial movement of modules. The other components of the module 200 are similar to the module 100 of FIGS. 3-7. For example, the module 200 includes a central portion 210, a plurality of T-shaped lead links 221, lead hinge openings 282, and a plurality of T-shaped lag links 231.

Figure 16:
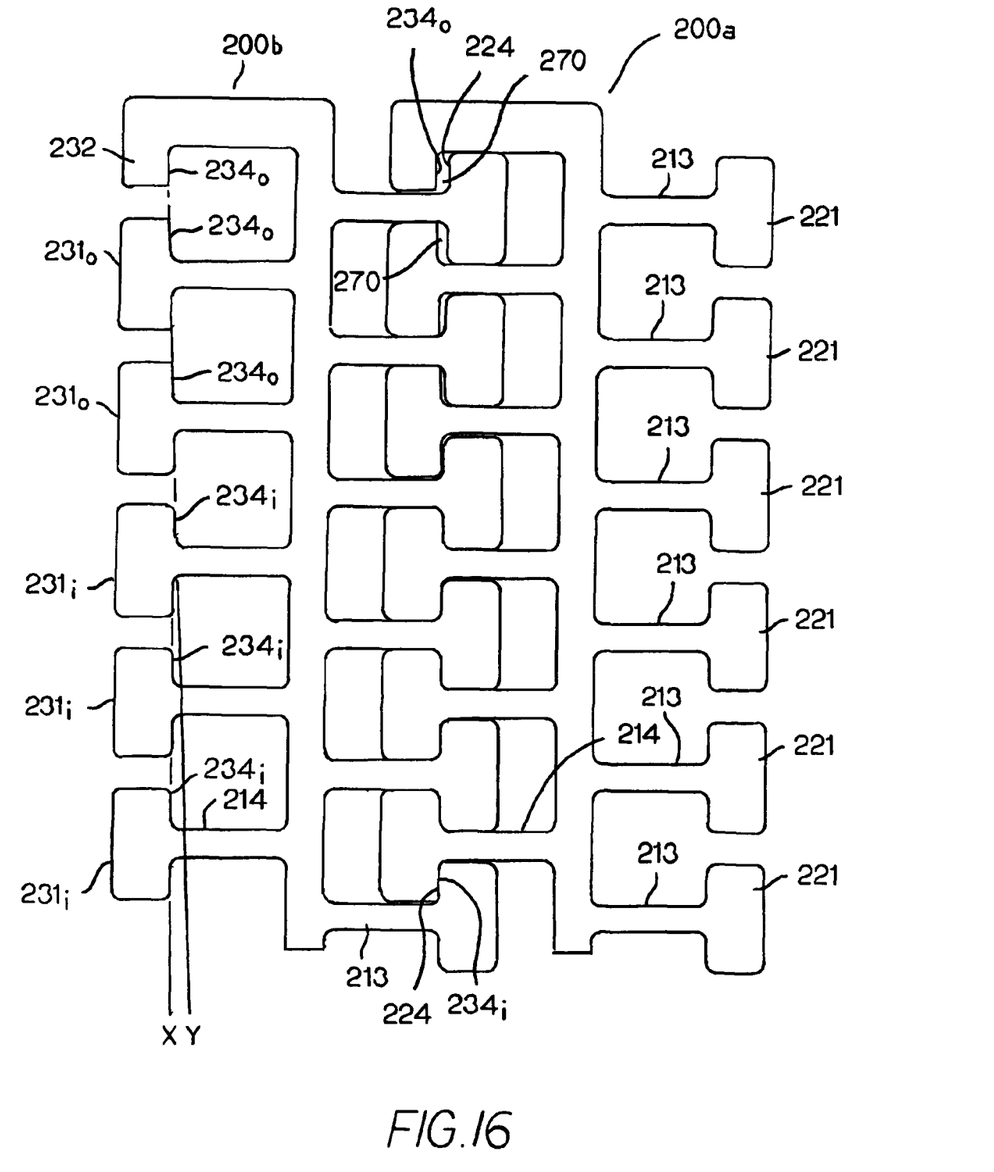
FIG. 16 illustrates two linked radius belt modules according to an illustrative embodiment of the invention.

The illustrative radius conveyor belt module 200 evenly distributes a load across more links on the outer edge during a turn in the conveyor. FIG. 16 illustrates a portion of a conveyor belt including two hingedly connected modules 200a and 200b. As shown in FIG. 16, the inner load transferring surfaces 234i on the inner three lag links 231i align with an axis X that is substantially perpendicular to the link ribs 213, 214. The outer load-transferring surfaces 234o on the outer three lag links 231o align with an axis Y that is angled relative to or spaced from the axis X. In the illustrative embodiment, the outermost lag link 232 is L-shaped, though the outermost link may also be T-shaped. In this manner, when the conveyor belt runs in a straight direction, inner load-transferring surfaces 224, 234 contact each other to transfer load between the adjacent modules. When the belt runs straight, as shown in FIG. 16, a gap 270 separates the outer load-transferring surfaces 234o, 224 of adjacent modules 200a, 200b from each other. When the belt turns, the outer load-transferring surfaces 224, 234o contact each other to distribute load from row to row.

The load-transferring surfaces 224, 234 can be designed to have several shapes to improve load sharing at different collapsed angles.

The present invention has been described relative to certain illustrative embodiments. Since certain changes may be made in the described constructions without departing from the scope of the invention, it is intended that all matter contained in the description or shown in the accompanying drawings be interpreted as illustrative and not in a limiting sense.

What is claimed is:

1. A module for a conveyor belt, comprising:
    a central portion having a first end and an opposite second end defining the length of the central portion, a top side and an opposite bottom side defining the thickness of the central portion, and a first edge and an opposite second edge defining the width of the central portion; and
    a first linking portion comprising at least one link extending from the first end of the central portion, the link comprising a rib and a transverse link end extending perpendicular to the rib, the transverse link end including a flat upper load-transferring surface extending substantially perpendicular to the rib, a flat lower load-transferring surface extending substantially perpendicular to the rib, and a channel separating the upper load-transferring surface from the lower load-transferring surface.

2. The module of claim 1, wherein the transverse link end comprises a semi-cylinder.

3. The module of claim 1, wherein the link further comprises a hinge opening intersecting the channel for receiving a hinge rod.

4. The module of claim 3, wherein the hinge opening is kidney-shaped.

5. The module of claim 1, further comprising a second linking portion extending from the second end of the central portion, the second linking portion comprising a link comprising a rib and a transverse link end extending perpendicular to the rib.

6. The module of claim 1, wherein the transverse link end and rib have a thickness equal to the thickness of the central portion.

7. The module of claim 1, wherein the first linking portion comprises a plurality of links spaced across the first end of the central portion, each link comprising a rib and a transverse link end.

8. The module of claim 7, wherein the ribs are separated by a distance approximately equal to a width of each transverse link end.

9. The module of claim 7, wherein each transverse link end is separated from an adjacent transverse link end by a gap that is approximately equal to a width of each rib.

10. A module for a conveyor belt, comprising:
    a central portion having a first end and an opposite second end defining the length of the central portion, a top side and an opposite bottom side defining the thickness of the central portion, and a first edge and an opposite second edge defining the width of the central portion;
    a first linking portion comprising a first set of T-shaped links, each T-shaped link including a rib extending from the first end of the central portion and a transverse link end substantially perpendicular to the rib, the transverse link end having a flat inner surface that is substantially perpendicular to the rib, the first linking portion further including a plurality of kidney-shaped openings that curves up towards the top side of the module; and a second linking portion comprising a second set of T-shaped links extending from the second end of the central portion, the second linking portion further including a plurality of kidney-shaped openings that curve down towards the bottom side of the module.

11. The module of claim 10, wherein each flat inner surface of each transverse link end in the first T-shaped link includes an upper load-transferring surface, a lower load-transferring surface, and the transverse link end further includes channel separating the upper load-transferring surface from the lower load-transferring surface.

12. The module of claim 10, wherein the ribs of the first set of T-shaped links are transversely offset from the ribs of the second set of T-shaped links.

13. The module of claim 10, wherein each transverse link end is separated from an adjacent transverse link end by a gap that is approximately equal to a width of each rib.

14. The module of claim 10, wherein each rib is separated from an adjacent rib by a distance approximately equal to a width of each transverse link end.

15. The module of claim 10, wherein each transverse link end is semi- cylindrical and includes a substantially flat load-transferring surface.

16. The module of claim 10, wherein the central portion, first linking portion, and second linking portion are coplanar and equal in thickness.

17. A module for a conveyor belt, comprising:
a central portion having a first end and an opposite second end defining the length of the central portion, a top side and an opposite bottom side defining the thickness of the central portion, and a first edge and an opposite second edge defining the width of the central portion;
a first linking portion comprising a plurality of links extending from the first end of the central portion, each link comprising a rib and a transverse linking member extending perpendicular to the rib having a transverse channel on an inner surface thereof; and
a plurality of kidney-shaped hinge openings formed in the links, each kidney-shaped opening having a curved upper surface, a curved bottom surface, a first curved side surface and a second curved side surface, the second curved outside surface of the kidney-shaped opening forming an extension of the transverse channel.

18. The module of claim 17, wherein the kidney-shaped hinge openings are aligned to form a hinge passageway.

19. The module of claim 17, further comprising a second linking portion comprising a plurality of links extending from the second end of the central portion.

20. The module of claim 19, wherein the second linking portion includes a plurality of kidney-shaped hinge openings.

21. The module of claim 20, wherein the kidney-shaped hinge openings in the first linking portion curve in a first direction and the kidney-shaped hinge openings in the second linking portion curve in a second, opposite direction.

22. A conveyor belt, comprising:
a first module comprising a first central portion, a plurality of first T-shaped link elements extending from a first end of the first central portion, each first T-shaped link element having a rib extending in a direction of travel and a transverse link end having a flat inner surface that extends substantially perpendicular to the rib, and a plurality of aligned first hinge openings formed in the plurality of first T-shaped link elements;
a second module comprising a second central portion, a plurality of second T-shaped link elements linked with the first T-shaped link elements of the first module, each second T- shaped link element having a rib extending in a direction of travel and a transverse link end having a flat inner surface that extends substantially perpendicular to the rib, and a plurality of aligned second hinge openings, wherein the first and second hinge openings align to form a hinge passageway; and
a hinge rod inserted into the hinge passageway.

23. The conveyor belt of claim 21, wherein the first and second hinge openings are kidney-shaped.

24. The conveyor belt of claim 23, wherein the first hinge openings curve in a first direction and the second hinge openings curve in a second, opposite direction.

25. The conveyor belt of claim 22, wherein the flat inner surfaces of the first T-shaped link elements contact the flat inner surfaces of the second T-shaped link elements.

26. The conveyor belt of claim 22, wherein side surfaces of the transverse link ends of the first module abut side surfaces of ribs of the second module.

27. The conveyor belt of claim 22, wherein each flat inner surface includes a channel for receiving the hinge rod.

28. A module for a conveyor belt, comprising:
a central portion having a first end and an opposite second end defining the length of the central portion, a top side and an opposite bottom side defining the thickness of the central portion, and a first edge and an opposite second edge defining the width of the central portion; and
a first linking portion comprising at least one link extending from the first end of the central portion, the link comprising a rib extending in thickness from a top surface to a bottom surface and a transverse link end extending perpendicular to the rib, the transverse link end extending in thickness from a top edge that is coplanar with the top surface of the rib to a bottom edge that is coplanar with the bottom surface of the rib, the transverse link end having a flat inner surface that extends substantially perpendicular to the rib.

29. The module of claim 28, wherein the flat inner surface of the transverse link end includes an upper load-transferring surface, a lower load-transferring surface, and a channel separating the upper load-transferring surface from the lower load- transferring surface.

30. The module of claim 28, further comprising a hinge opening formed in the link.

31. The module of claim 30, wherein the hinge opening is kidney-shaped.

32. The module of claim 28, further comprising a second linking portion comprising at least one link extending from the second end of the central portion, the link of the second linking portion having a rib and a transverse link end extending perpendicular to the rib.

33. A module for a conveyor belt, comprising:
a central portion having a first end and an opposite second end defining the length of the central portion, a top side and an opposite bottom side defining the thickness of the central portion, and a first edge and an opposite second edge defining the width of the central portion;
a first link extending from the second end of the central portion, the first link comprising a first rib and a first transverse link end extending perpendicular to the first rib, the first transverse link end having a flat inner surface that extends substantially perpendicular to the first rib; and a second link extending from the first end of the central portion, the second link comprising a second rib and a second transverse link end extending perpendicular to the second rib, wherein the first and second ribs are separated by a rib separation distance that is substantially equal to the widths of the first and second transverse link ends.

34. The module of claim 33, wherein the first transverse link end and the second transverse link end are separated by a link end separation distance that is substantially equal to the width of each rib.

35. The module of claim 33, wherein the widths of the first and second transverse link ends are larger than the distance between the first and second transverse link ends.

36. The module of claim 33, further comprising a third link extending from the second end of the central portion, the third link comprising a third rib and a third transverse link end extending substantially perpendicular to the third rib.

37. The module of claim 36, wherein the third rib aligns with a space between the first and second transverse link ends.

38. The module of claim 20, wherein the kidney-shaped openings in the first linking portion curve up towards the top side of the module and the kidney-shaped hinge openings in the second linking portion curve down towards the bottom side of the module.

* * * * *